US009834066B2

(12) United States Patent
Sudou et al.

(10) Patent No.: US 9,834,066 B2
(45) Date of Patent: Dec. 5, 2017

(54) SLIDING WINDOW FOR VEHICLE AND POWER SUPPLY APPARATUS

(71) Applicants: NISSAN MOTOR LIGHT TRUCK CO., LTD., Saitama (JP); HI-LEX CORPORATION, Hyogo (JP); SUMITOMO WIRING SYSTEMS, LTD., Mie (JP)

(72) Inventors: Yutaka Sudou, Saitama (JP); Masanao Asaoka, Saitama (JP); Ryota Nishikawa, Hyogo (JP); Makoto Iwata, Mie (JP)

(73) Assignees: NISSAN MOTOR LIGHT TRUCK CO., LTD. (JP); HI-LEX CORPORATION (JP); SUMITOMO WIRING SYSTEMS, LTD. (JP)

( * ) Notice: Subject to any disclaimer, the term of this patent is extended or adjusted under 35 U.S.C. 154(b) by 0 days.

(21) Appl. No.: 14/959,519

(22) Filed: Dec. 4, 2015

(65) Prior Publication Data

US 2016/0121700 A1    May 5, 2016

Related U.S. Application Data

(63) Continuation of application No. PCT/JP2014/069162, filed on Jul. 18, 2014.

(30) Foreign Application Priority Data

Aug. 7, 2013    (JP) .................................. 2013-163904

(51) Int. Cl.
  *B60J 1/18*    (2006.01)
  *B60R 16/02*   (2006.01)
  *H05B 3/84*    (2006.01)

(52) U.S. Cl.
  CPC .......... *B60J 1/1853* (2013.01); *B60R 16/0215* (2013.01); *H05B 3/84* (2013.01); *H05B 2203/016* (2013.01)

(58) Field of Classification Search
  CPC .... B60J 1/1853; B62D 27/02; B60R 16/0215; H05B 3/84; H05B 2203/016
  (Continued)

(56) References Cited

U.S. PATENT DOCUMENTS 6,183,040 B1 * 2/2001 Imaizumi ............. H02H 7/0851
                                                    296/155
6,324,788 B1    12/2001 Koneval et al.
(Continued)

FOREIGN PATENT DOCUMENTS

JP    08040149     2/1996
JP    111066357    6/1999
(Continued)

OTHER PUBLICATIONS

International Search Report for Application No. PCT/JP2014/069162 dated Oct. 7, 2014.
(Continued)

*Primary Examiner* — Pinel E Romain
(74) *Attorney, Agent, or Firm* — Lerner, David, Littenberg, Krumholz & Mentlik, LLP (57) ABSTRACT

A sliding window for a vehicle includes: a sliding panel with an electrical equipment, which is attached to a vehicle body in a slidable manner; a guide rail which is integrated with the vehicle body and extending in the slide direction of the sliding panel; and a sliding bracket which integrally includes a sliding portion coupled to the guide rail in a slidable manner and a fixed portion fixed to the sliding panel. Then, an electrical power supply cord is disposed along the guide rail to be extended and contracted in one direction, and the (Continued)

electrical power supply cord supplies electric power to the electrical equipment of the sliding panel.

17 Claims, 12 Drawing Sheets

(58) Field of Classification Search
USPC .................................................. 296/146.16
See application file for complete search history.

(56) References Cited

U.S. PATENT DOCUMENTS

| | | | |
|---|---|---|---|
| 8,402,695 B2 | 3/2013 | Smith et al. | |
| 8,938,914 B2* | 1/2015 | Hulst | E05F 11/488 |
| | | | 49/127 |
| 2004/0020131 A1* | 2/2004 | Galer | B60J 1/1861 |
| | | | 49/413 |
| 2006/0011597 A1* | 1/2006 | Dyrdek | H05B 3/84 |
| | | | 219/203 |
| 2006/0107600 A1* | 5/2006 | Nestell | E05D 15/0621 |
| | | | 49/413 |
| 2011/0030276 A1 | 2/2011 | Smith et al. | |
| 2012/0091113 A1* | 4/2012 | Bennett | B60J 1/1853 |
| | | | 219/203 |
| 2012/0091114 A1* | 4/2012 | Ackerman | B60J 1/1853 |
| | | | 219/203 |
| 2012/0117880 A1* | 5/2012 | Lahnala | B60J 1/1853 |
| | | | 49/70 |
| 2015/0292257 A1 | 10/2015 | Kondo | |
| 2015/0298528 A1* | 10/2015 | Lahnala | B60J 1/1853 |
| | | | 49/70 |

FOREIGN PATENT DOCUMENTS

| | | |
|---|---|---|
| JP | 2006240603 A | 9/2006 |
| WO | 2014103826 A1 | 7/2014 |

OTHER PUBLICATIONS

Chinese Patent Office Action dated Nov. 14, 2016 in Appln. No. 201480038813.8 and its English translation.
Extended European Search Report for Application No. 14835180.2 dated Feb. 24, 2017.
Japanese Office Action for Application No. 2013-163904 dated Aug. 29, 2017, 4 pages.

\* cited by examiner

SLIDING WINDOW FOR VEHICLE AND POWER SUPPLY APPARATUS

CROSS-REFERENCE TO RELATED APPLICATIONS

This application is a continuation application of PCT/JP2014/069162, filed on Jul. 18, 2014.

FIELD OF THE INVENTION

The present invention relates to a sliding window for a vehicle and a power supply apparatus.

BACKGROUND OF THE INVENTION

As disclosed in U.S. Patent Application Publication No. 2011/0030276, there is known a sliding window equipped with a defroster for removing frost by a printed heating wire, which is attached to a rear window of a vehicle. In such a sliding window, a band-shaped flexible cable is used in order to supply electric power to the heating wire regardless of the opening and closing state of the sliding window.

However, since the flexible cable is curved in a circular-arc shape, a fixing mechanism and a holding mechanism are required. Thus, a power supply apparatus which supplies electric power to an electrical equipment such as the heating wire of the sliding window, tends to be complex. When the power supply apparatus has a complex structure, for example, a technical difficulty occurs in a vehicle layout such that the power supply apparatus may not be easily provided between the rear panel and the trim board.

SUMMARY OF THE INVENTION

Here, an object of the invention is to provide a sliding window for a vehicle and a power supply apparatus. These can facilitate a vehicle layout and supply electric power to an electrical equipment of the sliding window at all times.

A sliding window for a vehicle includes: a sliding panel with an electrical equipment which is attached to a vehicle body in a slidable manner; a guide rail which is integrated with the vehicle body and extending in the slide direction of the sliding panel; and a sliding bracket which integrally includes a sliding portion coupled to the guide rail in a slidable manner and a fixed portion fixed to the sliding panel. Then, an electrical power supply cord which is disposed along the guide rail to be extendable in one direction, supplies electric power to the electrical equipment of the sliding panel.

A power supply apparatus includes: a guide rail which is integrated with a vehicle body and extending in the slide direction of a sliding panel which is slidably attached to the vehicle body; and a sliding bracket which integrally includes a sliding portion coupled to the guide rail in a slidable manner and a fixed portion fixed to the sliding panel. Then, an electrical power supply cord which is disposed along the guide rail to be extendable in one direction, supplies electric power to the sliding panel.

According to the embodiment of the invention, it is possible to facilitate a vehicle layout and supply electric power to an electrical equipment of a sliding window at all times.

DETAILED DESCRIPTION OF PREFERRED EMBODIMENTS

Embodiments for carrying out the invention will be described with reference to the accompanying drawings.

Figure 1:
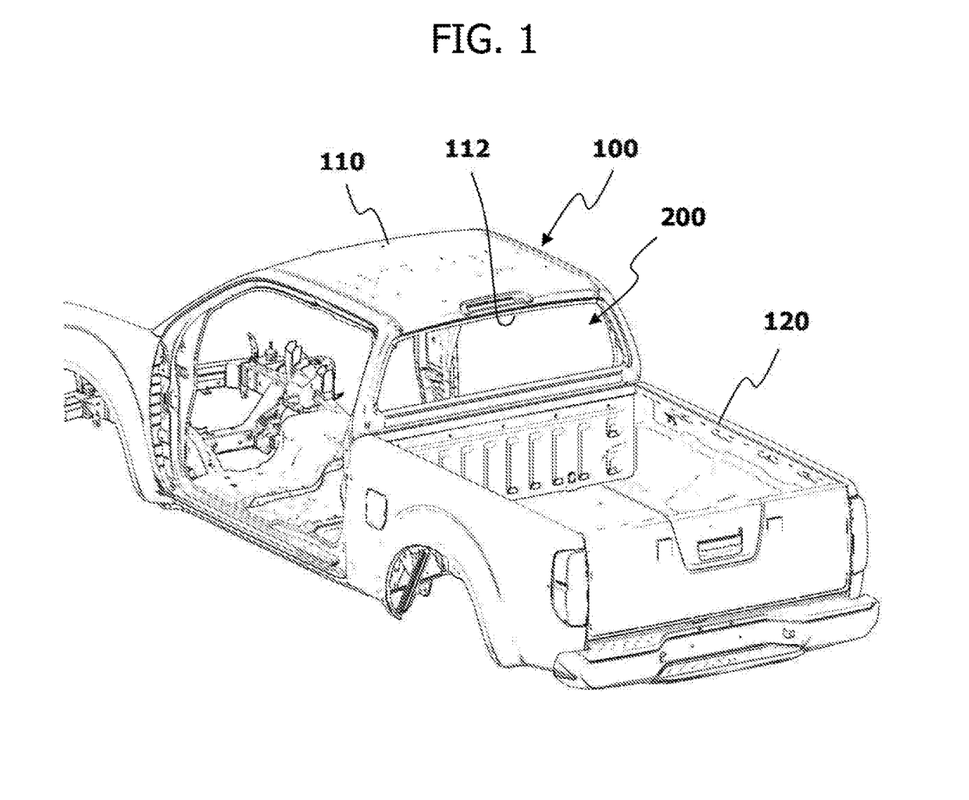
FIG. 1 is a perspective view illustrating an example of a vehicle that employs a sliding window.

FIG. 1 illustrates an example of a vehicle that employs a sliding window.

A pickup truck 100 includes an open type (no lid) pickup bed 120 at the rear side of a cabin 110 (a vehicle body). A rear window 200 with a sliding window is attached to an opening 112 opened at the rear surface of the cabin 110. Here, the opening 112 of the cabin 110 is opened in a trapezoidal shape along the vehicle width direction of the pickup truck 100. In addition, the "trapezoidal shape" is not limited to a complete trapezoidal shape, but may be recognized as a trapezoidal shape in appearance. Furthermore, the opening 112 of the cabin 110 is not limited to the trapezoidal shape, but may be formed in another shape, for example, a rectangular shape.

Figure 2:
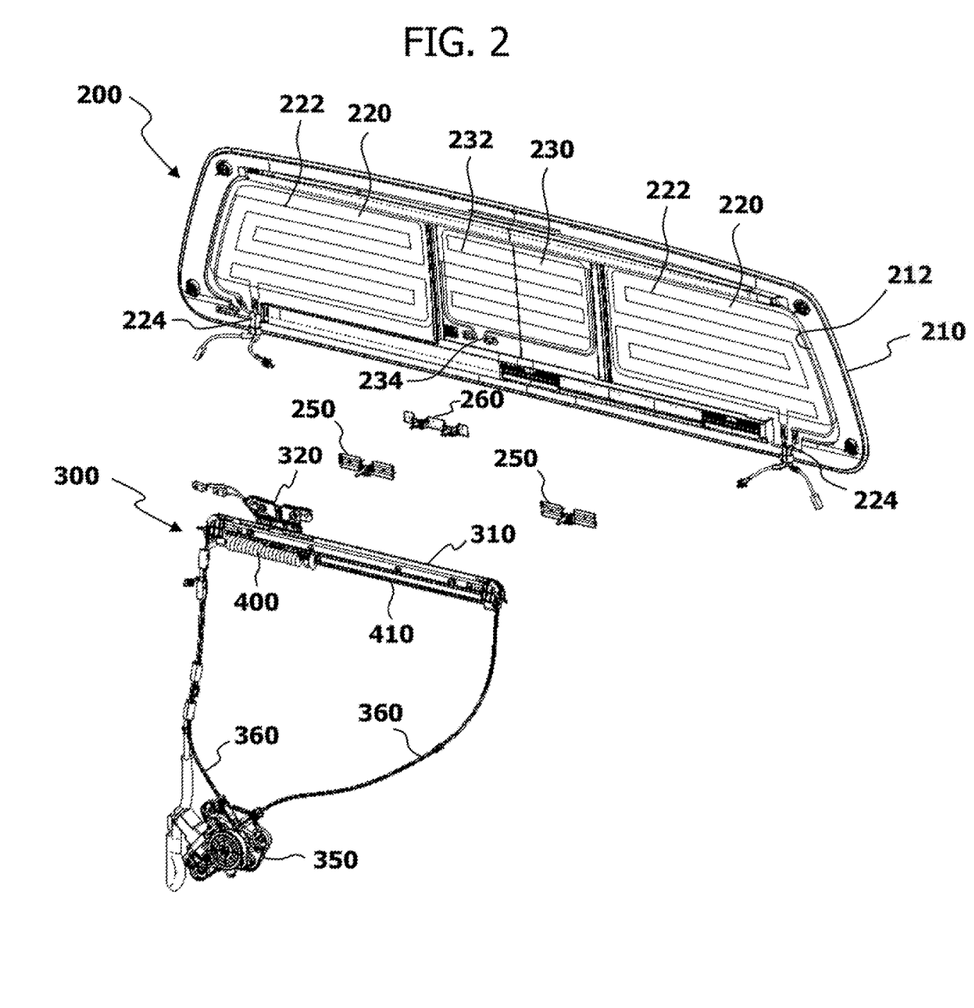
FIG. 2 is a detailed perspective view illustrating a rear window.

As illustrated in FIG. 2, the rear window 200 includes a window frame member 210 which is attached to the opening 112 of the cabin 110. The window frame member 210 is a resinous member that extends in the vehicle width direction of the pickup truck 100, and the peripheral edge thereof is fixed to the opening 112 of the cabin 110 by, for example, a fastening material such as an adhesive or a fitting to a groove.

A guide rail 310 which extends in the slide direction of a sliding panel 230 mounted in a slidable manner is integrated with the window frame member 210. As will be described later, a sliding bracket 320 which integrally includes a sliding portion slidably coupled to the guide rail 310 and a fixed portion fixed to the sliding panel 230, is attached to the guide rail 310. Then, a curled cord 400 which is extended and contracted in one direction while being disposed along the guide rail 310, supplies electric power to an electrical equipment of the sliding panel 230. That is, electric power can be supplied to the electrical equipment of the sliding panel 230 at all times by the curled cord 400 having an easy vehicle layout.

Details of the sliding window with such a configuration will be described below.

The window frame member 210 includes an opening 212 of which the center is opened except for the peripheral edge thereof, and a fixed panel 220 is attached to both ends of the opening 212 in the longitudinal direction, that is, both left and right ends of the opening 212. The fixed panel 220 is formed of, for example, a transparent or translucent glass plate, a resin plate, or a metal plate, and is fixed to the window frame member 210 with a fastening material such as an adhesive or a fitting to a groove. Accordingly, an opening which communicates the inside of the cabin 110 with the outside of the cabin 110 is formed between a pair of the fixed panels 220 disposed at the left and right sides of the opening 212 of the window frame member 210. Furthermore, the fixed panel 220 and the window frame member 210 may be formed molded in one piece, or the fixed panel 220 may be integrally formed or integrated with the window frame member 210.

Figure 3:
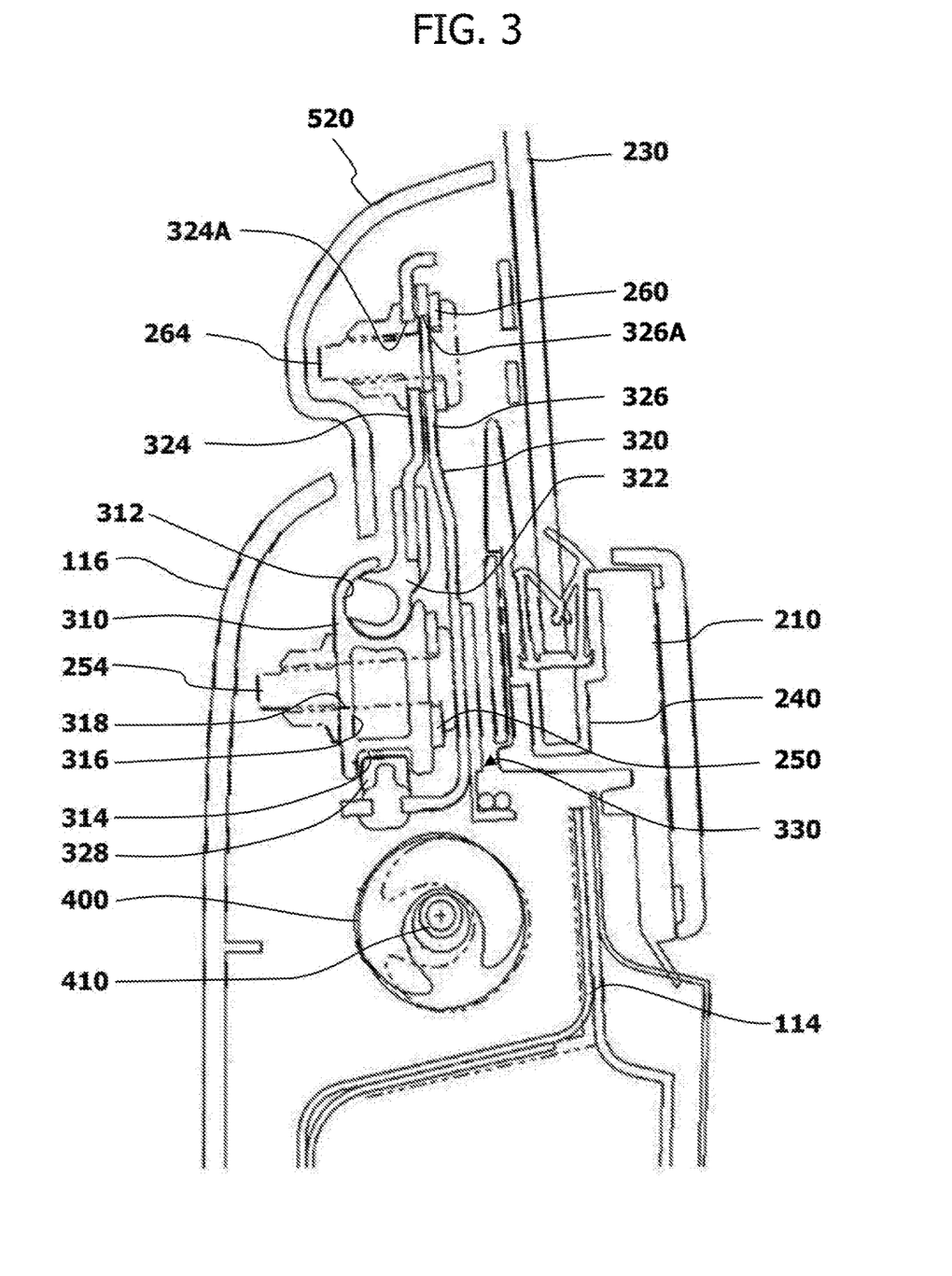
FIG. 3 is a longitudinal sectional view illustrating a main part of the rear window.

As illustrated in FIG. 3, a pair of upper and lower rails 240 which supports the upper and lower ends of the sliding panel 230 that opens and closes the opening of the rear window 200 so as to be slidable in the vehicle width direction is integrated with the center portions of the upper and lower sides of the window frame member 210 at the center position in the vehicle width direction. The pair of upper and lower rails 240 has, for example, a cross-section having a channel shape (a U-shape or a C-shape), and the facing surfaces are opened. The rail 240 is made of, for example, metal such as an aluminum alloy, and in order to improve the installation position precision for the window frame member 210, the rail 240 is integrated with the window frame member 210 by a resin when the fixed panel 220 and the window frame member 210 is molded by casting. The sliding panel 230 is formed of, for example, a transparent or translucent glass plate, a resin plate, or a metal plate. In addition, the "channel shape" may be recognized as a channel shape in appearance.

Heating wires 222 and 232 as defrosters are respectively printed on the inner surfaces of the fixed panel 220 and the sliding panel 230, that is, the surfaces facing the inside of the cabin 110. The heating wires 222 and 232 may be integrated with the fixed panel 220 and the sliding panel 230, respectively, when the fixed panel 220 and the sliding panel 230 are manufactured. A connector 224 which supplies electric power to the heating wire 222 is attached to the lower portion of the fixed panel 220. The connector 224 of the fixed panel 220 is connected to a battery (not shown) mounted on the pickup truck 100 through, for example, a voltage stabilizer and a relay. Furthermore, a pair of terminals 234 which supplies electric power to the heating wire 232 is formed at the lower portion of the sliding panel 230. In addition, the heating wires 222 and 232 are exemplified as the electrical equipment.

Figure 4:
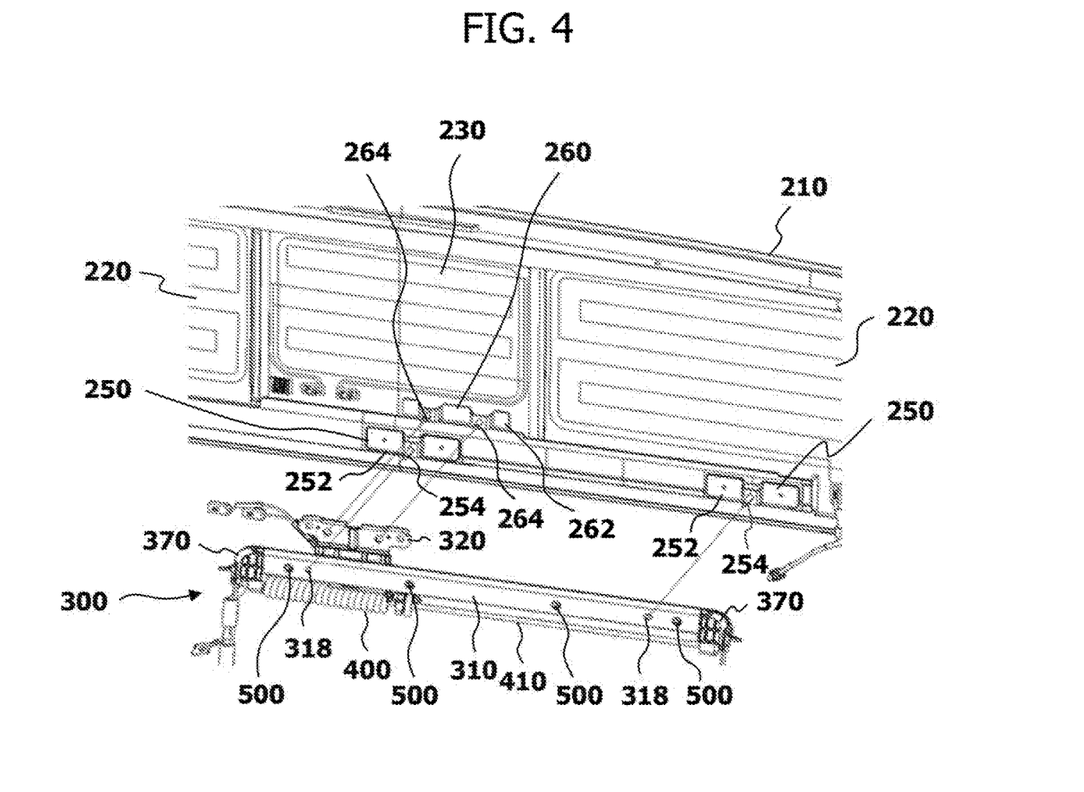
FIG. 4 is a detailed perspective view illustrating an installation structure of an electric slide mechanism.

As illustrated in FIG. 4, a pair of left and right first brackets 250 is attached to two separated positions of the lower inner surface of the window frame member 210 respectively in order to fix an electric slide mechanism 300 that electrically slides the sliding panel 230. The pair of left and right first brackets 250 is made of, for example, metal such as an aluminum alloy, and includes a hat-shaped plate member 252 and a pin member 254 that extends outward from the tip of the plate member 252. Then, the base portion of the plate member 252 of the first bracket 250 is fixed to a predetermined position of the window frame member 210, for example, with a fastening material such as an adhesive. Here, the "hat shape" is not limited to a complete hat shape, but it may be recognized as a hat shape in appearance. In addition, the first bracket 250 may be integrated with the window frame member 210 by a resin when the window frame member 210 is molded by casting.

Furthermore, as illustrated in FIG. 4, a second bracket 260 which regulates the relative position of the sliding panel 230 with respect to the pair of upper and lower rails 240 is attached to the lower inner surface of the sliding panel 230. The second bracket 260 is made of, for example, metal such as an aluminum alloy, and includes a plate member 262 which has two continuous hat shapes and two pin members 264 that extend outward from the tip of the plate member 262. Then, the base portion of the plate member 262 of the second bracket 260 is fixed to a predetermined position of the sliding panel 230, for example, with a fastening material such as an adhesive. In addition, the second bracket 260 may be integrated with the sliding panel 230 when the sliding panel 230 is manufactured.

Figure 5:
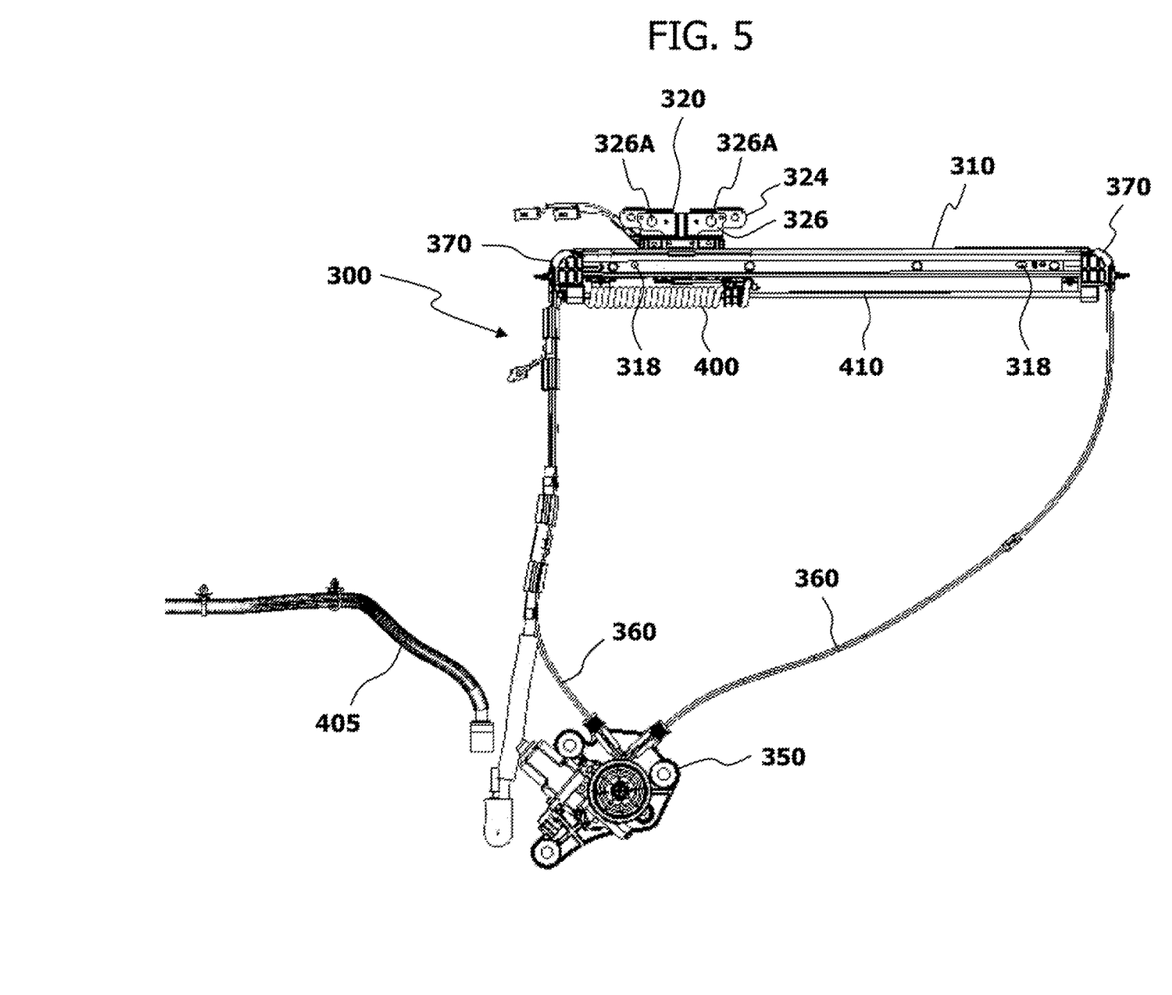
FIG. 5 is a detailed perspective view illustrating the electric slide mechanism.

As illustrated in FIG. 5, the electric slide mechanism 300 which is fixed to the window frame member 210 through the first bracket 250 includes a guide rail 310 which extends in the slide direction of the sliding panel 230 and guides the sliding panel 230 in the slide direction. The guide rail 310 is made of metal such as an aluminum alloy. Here, as illustrated in FIG. 3, in the entire length of the guide rail 310 in the axial direction, the upper portion thereof is provided with a circular-arc shaped upper slide groove 312 and the lower portion thereof is provided with a channel-shaped (a C-shaped or a U-shaped) lower slide groove 314. Here, the "circular-arc shape" is not limited to a complete circular-arc shape, but may be recognized as a circular-arc shape in appearance. Furthermore, a cavity 316 for reducing the weight is formed at the center of the guide rail 310 in the up and down direction, and an insertion hole 318 through which the pin member 254 of the first bracket 250 is inserted is provided.

Figure 6:
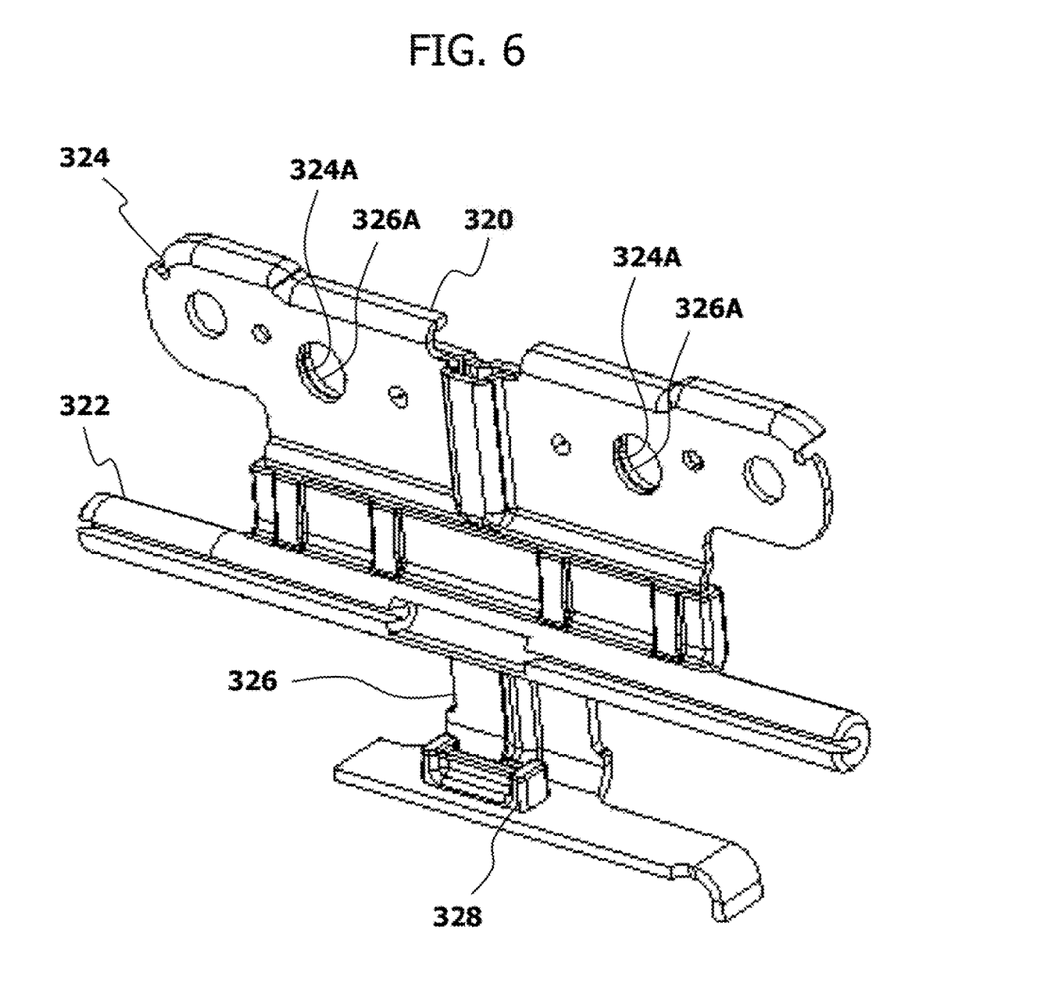
FIG. 6 is a detailed perspective view illustrating a sliding bracket.

The sliding bracket 320 is coupled along the upper slide groove 312 of the guide rail 310 so as to be slidable along the upper slide groove 312. As illustrated in FIGS. 3 and 6, the sliding bracket 320 includes a cylindrical slide member 322 which is formed in a shape similar to the circular-arc shape of the upper slide groove 312, a first plate member 324 which extends upward from the slide member 322 at the upper and rear portion of the slide member 322 and fixes the sliding panel 230, a second plate member 326, and a block 328. Since the slide member 322 is rotatable only by a predetermined angle about the axial direction of the upper slide groove 312, the tolerance of the precision of the installation position of the guide rail 310 and the sliding panel 230 is absorbed, and hence the sliding panel 230 can be smoothly opened and closed. The predetermined angle at which the slide member 322 is rotatable is set as a range in which a plate surface of the first plate member 324 contacts the opening of the upper slide groove 312. As illustrated in FIG. 6, the first plate member 324 is formed in a T-shape in the side view, and each of both extension portions thereof is provided with an insertion hole 324A through which the pin member 264 of the second bracket 260 is inserted. Here, the "T-shape" is not limited to a complete T-shape, but it may be recognized as a T-shape in appearance. Furthermore, the slide member 322 is made of, for example, a resin having a small friction coefficient in order to slide with respect to the guide rail 310, and the first plate member 324 is made of, for example, metal such as an aluminum alloy.

The second plate member 326 of the sliding bracket 320 is formed in an L-shape in the side view, and is disposed on the rear surface of the first plate member 324. Here, the "L-shape" is not limited to a complete L-shape, but it may be recognized as an L-shape in appearance. The second plate member 326 is made of, for example, metal such as an aluminum alloy, and is formed in an L-shape, that is, the second plate member 326 extends rearward while facing the lower slide groove 314 of the guide rail 310, and then, extends upward from the rear end thereof. As illustrated in FIG. 5, the second plate member 326 includes a portion which is formed in a T-shape similar to the first plate member 324 in the side view, and each of both extension portions thereof is provided with an insertion hole 326A through which the pin member 264 of the second bracket 260 is inserted. In addition, a portion which extends in the up and down direction of the second plate member 326 is narrower than a portion which extends in the up and down direction of the first plate member 324, and a step is formed therebetween. The step is used as a gap through which an electrical power supply cord for supplying electric power to the heating wire 232 of the sliding panel 230 passes via a cord-holding bracket 330, which will be described later.

Here, the slide member 322 of the sliding bracket 320 is exemplified as the sliding portion, and a portion which is fixed to the second bracket 260 in the second plate member 326 of the sliding bracket 320 is exemplified as the fixed portion.

As illustrated in FIGS. 3 and 6, for example, a resin-made block 328 which is fitted to the lower slide groove 314 in a slidable manner is attached to a portion which faces the lower slide groove 314 of the guide rail 310 in the second plate member 326 of the sliding bracket 320. Accordingly, when the pin member 264 of the second bracket 260 is inserted through the insertion hole 324A of the first plate member 324 and the insertion hole 326A of the second plate member 326 in the sliding bracket 320 and is integrated by screwing a fastening member such as a nut to the tip thereof, the guide rail 310 is interposed between the first plate member 324 and the second plate member 326 of the sliding bracket 320. For this reason, the movement of the sliding bracket 320 on the perpendicular surface of the guide rail 310 is regulated, and hence the position precision of the sliding panel 230 connected to the sliding bracket 320 can be improved.

In other words, two opposite surfaces of the guide rail 310 in a surface parallel to the sliding panel 230 are interposed between the first plate member 324 and the second plate member 326 of the sliding bracket 320, and hence the movement of the sliding bracket 320 on the perpendicular surface of the guide rail 310 is regulated.

Furthermore, as illustrated in FIG. 3, the cord-holding bracket 330 which holds the electrical power supply cord at a predetermined position is attached to the side surface opposite to the guide rail 310 in both side surfaces of the second plate member 326 of the sliding bracket 320. The cord-holding bracket 330 is made of, for example, a resin such as plastic or metal such as an aluminum alloy.

Figure 8:
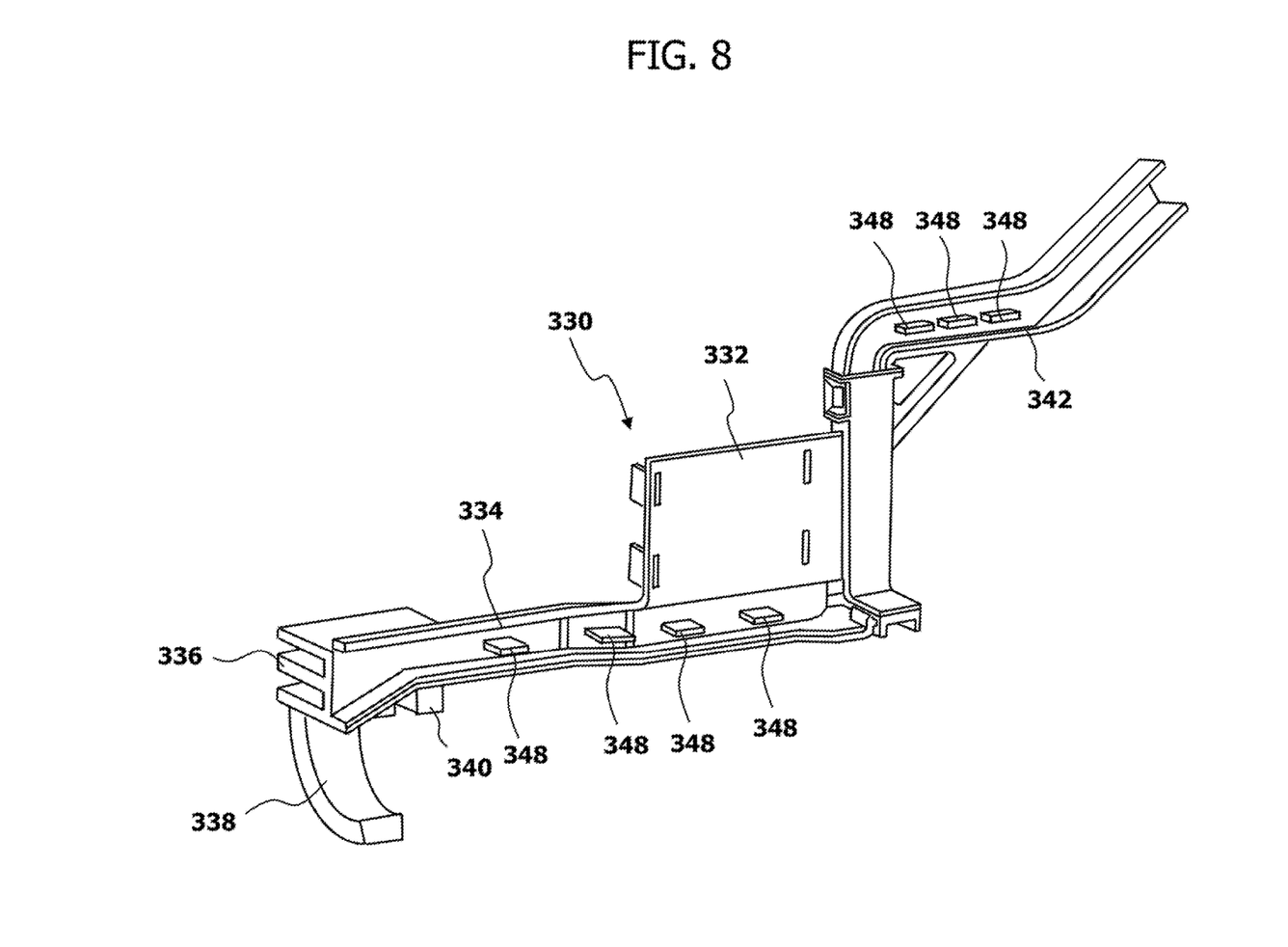
FIG. 8 is a detailed perspective view illustrating a cord-holding bracket.
Figure 9:
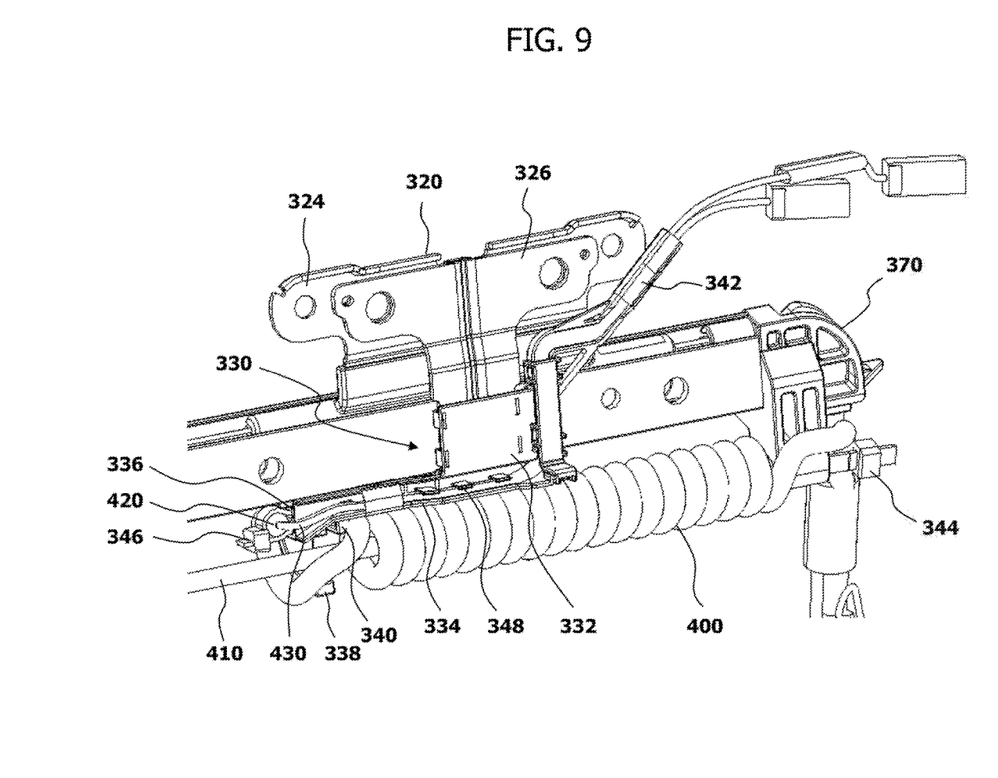
FIG. 9 is a detailed perspective view illustrating a curled cord (curl cord) fixing method.

As illustrated in FIGS. 8 and 9, the cord-holding bracket 330 includes a base portion 332 which is formed in a flat plate-like form and serves as an attachment portion to the second plate member 326 of the sliding bracket 320 and an extension portion 334 which has a channel-shaped cross-section and extends from the lower end of the base portion 332 in the axial direction of the guide rail 310. A distal end portion of the extension portion 334 is provided with a cord fixed portion 336 which fixes the electrical power supply cord. In the upper and lower directions of the cord fixed portion 336, a C-shaped guide portion 338 which is formed in a C-shape, outwardly protrudes from a surface of the cord fixed portion 336 at the side surface opposite to the base portion 332, via the extension portion 334. That is, the C-shaped guide portion 338 is integrally held by the base portion 332. Here, the "C-shape" may be recognized as a C-shape in appearance. Furthermore, in the distal end portion of the extension portion 334, at the side of the C-shaped guide portion 338 which outwardly protrudes, a protruding guide portion 340 which outwardly protrudes is integrally formed with the extension portion 334, and the protruding guide portion 340 is arranged at a predetermined interval from the C-shaped guide portion 338 in a direction of the base portion 332. In addition, the base end of the extension portion 334 is provided with an extension portion 342 which upwardly extends in an inverted L-shape upward and has a channel-shaped in cross-section.

The sliding bracket 320, which is attached to the guide rail 310, interlockingly moves along the guide rail 310 with a pair of cables 360 sliding (traveling in a reciprocating manner) by a drive unit 350 including an electric motor provided therein. Here, the drive unit 350 may include a speed reducer that reduces the output rotation of the electric motor. Furthermore, the cable 360 includes a cylindrical outer cable and an inner cable which slides inside the outer cable. Then, each of the distal ends of the inner cables of the pair of cables 360 are connected to the slide member 322 of the sliding bracket 320. In addition, the drive unit 350 is attached to a rear panel (not illustrated) of the cabin 110 of the pickup truck 100.

A joint 370 having a function which changes the slide direction of the inner cable of the cable 360 is fixed to each of both ends of the guide rail 310. A base end of a spiral portion of the curled cord 400 which is extensible in one direction so as to supply electric power to the heating wire 232 of the sliding panel 230 through the sliding bracket 320 is fixed to the joint 370 fixed to one end of the guide rail 310. The base end of the spiral portion of the curled cord 400 is connected to the battery mounted on the pickup truck 100 through, for example, through a power source harness 405 provided with a voltage stabilizer and a relay. In addition, the curled cord 400 is exemplified as an electrical power supply cord which is extensible in one direction.

As illustrated in FIG. 3, the curled cord 400 is disposed in a space which is located below the guide rail 310 and is interposed between an inner panel 114 that constitutes the rear panel of the cabin 110 and a trim board 116. Then, in order to regulate the arrangement position of the curled cord 400, a holding pipe 410 which extends along the guide rail 310 is inserted into the spiral portion of the curled cord 400. Both ends of the holding pipe 410 are respectively fixed to the joints 370 fixed to both ends of the guide rail 310, and are integrated with the guide rail 310. Accordingly, the curled cord 400 is disposed along the guide rail 310. In addition, the holding pipe 410 is exemplified as a holding member that maintains the position of the curled cord 400. Here, the holding member is not limited to the pipe-shaped holding pipe 410. For example, another member having any shape that holds the curled cord 400 so as not to disturb the extensible moving of the curled cord 400 in response to the slide of the sliding panel 230 may be employed.

As illustrated in FIG. 9, the free end of the curled cord 400 positioned after the spiral portion is guided to the step position between the first plate member 324 and the second plate member 326 along the extension portion 334 of the cord-holding bracket 330 integrated with the sliding bracket 320, and is then guided upward along the extension portion 342 of the cord-holding bracket 330. Here, an exterior material 420 of the free end of the curled cord 400 is peeled off as a lead wire 430 so as to be accommodated in the extension portions 334 and 342 of the cord-holding bracket 330. Then, the free end of the curled cord 400 is connected to the terminal 234 of the sliding panel 230. At this stage, in order to reliably fix the curled cord 400 to the cord-holding bracket 330, the distal end (one end) of the spiral portion of the curled cord 400 is fixed to the cord fixed portion 336 of the cord-holding bracket 330 by a fixing member such as a banding band.

Here, a detail of a method of fixing the curled cord 400 will be described.

As illustrated in FIG. 9, the base end of the spiral portion of the curled cord 400 straddles the joint 370 while the base end of the spiral portion is drawn and extended, and is fixed to the joint 370 through a banding band 344 inserted through a band insertion hole (not shown) formed in the outer surface of the joint 370. That is, the base end of the spiral portion of the curled cord 400 is crimped and held to the joint 370 by the elastic restoration force of the spiral portion. For this reason, even when the curled cord 400 is extended and contracted, a load displacement in the twisted direction caused by the extendable moving is absorbed by the spiral portion straddling the joint 370 before the load displacement reaches the banding band 344, and hence the concentration of stress at the base end of the spiral portion of the curled cord 400 can be reduced. Accordingly, it is possible to increase the durability and the reliability of the base end of the spiral portion of the curled cord 400. The base end of the spiral portion of the curled cord 400 may be fixed to the joint 370 directly or through an existing fixing member or a fixing member locked to a locking protrusion protruding from the joint 370 in a cantilevered state, instead of the banding band 344. Furthermore, the base end of the spiral portion of the curled cord 400 may be fixed to a panel that constitutes the cabin 110 of the pickup truck 100, etc. instead of the joint 370.

The distal end of the spiral portion of the curled cord 400 is straddled while being drawn and extended between the C-shaped guide portion 338 and the protruding guide portion 340 of the cord-holding bracket 330, and is fixed to the cord-holding bracket 330 through a binding band 346 inserted through a band insertion hole (not shown) formed in the cord fixed portion 336. That is, the distal end of the spiral portion of the curled cord 400 is crimped and held to the cord-holding bracket 330 by the elastic restoration force of the spiral portion. For this reason, it is possible to increase the durability and the reliability of the distal end of the spiral portion, similarly to those of the base end of the spiral portion of the curled cord 400. The distal end of the spiral portion of the curled cord 400 may be fixed to the cord-holding bracket 330 directly or through an existing fixing member or a fixing member locked to a locking protrusion protruding from the cord-holding bracket 330 in a cantilevered state instead of the binding band 346. Furthermore, the distal end of the spiral portion of the curled cord 400 may be directly fixed to the sliding bracket 320.

The exterior material 420 of the curled cord 400 positioned after the cord fixed portion 336 of the cord-holding bracket 330 is peeled off, so that the lead wire 430 is exposed. The lead wire 430 is disposed along the extension portions 334 and 342 of the cord-holding bracket 330. For this reason, a plurality of engaging protrusions 348 which engages with each other with the lead wire 430 interposed therebetween is disposed in the arrangement direction of the lead wire 430 in the extension portions 334 and 342 of the cord-holding bracket 330. In this way, for example, even when vibration generated by the traveling of the pickup truck 100 is transmitted to the curled cord 400, the lead wire 430 which is exposed by peeling off the exterior material 420 does not contact a member disposed in the periphery thereof, and hence the durability or the like can be improved.

In this state, the exterior material 420 is peeled off in a part of the curled cord 400, so that the lead wire 430 is exposed, and thus, the curled cord 400 can be disposed in a narrow space by using the step between the first plate member 324 and the second plate member 326 of the sliding bracket 320.

Accordingly, the spiral portion of the curled cord 400 is extended and contracted in response to the slide of the sliding bracket 320 with respect to the guide rail 310. For this reason, the spiral portion of the curled cord 400 may have at least a length in which the spiral portion can be extended and contracted between the fully opened position of the sliding panel 230 and the fully closed position of the sliding panel 230.

Next, an operation of opening and closing the sliding window will be described.

For example, when a driver of the pickup truck 100 operates a switch in order to open and close the sliding panel 230 of the rear window 200, the drive unit 350 is operated in response to the switch operation state. When the drive unit 350 is operated, the inner cable which is inserted into the outer cable of the cable 360 is slid, and the drive force is transmitted to the slide member 322 of the sliding bracket 320 while the slide direction of the inner cable is changed by the joint 370. Then, the sliding bracket 320 slides with respect to the guide rail 310, and, for example, as illustrated in FIG. 10, the sliding panel 230 integrated with the sliding bracket 320 is opened.

In this state, since a part of the block 328 attached to the second plate member 326 of the sliding bracket 320 is fitted to the lower slide groove 314 of the guide rail 310, the movement of the sliding bracket 320 on the perpendicular surface of the guide rail 310 is regulated. For this reason, the position precision of the sliding panel 230 with respect to the rail 240 is improved, and hence, the sliding panel 230 can be smoothly opened and closed.

Figure 10:
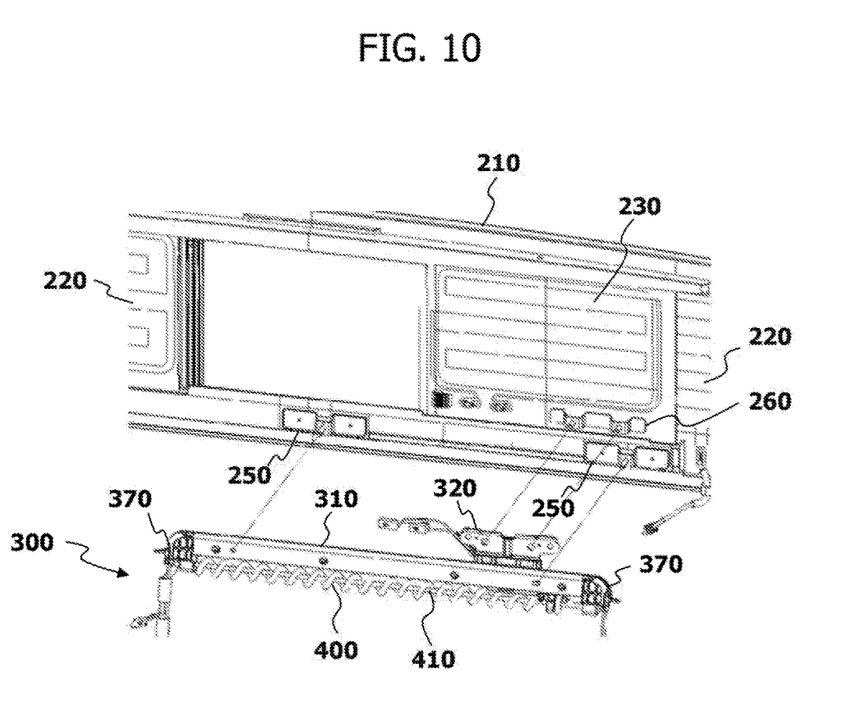
FIG. 10 is a perspective view illustrating a state in which a sliding panel of the rear window is opened.

Furthermore, as illustrated in FIGS. 4 and 10, since the curled cord 400 which supplies electric power to the heating wire 232 of the sliding panel 230 is extended and contracted in response to the opening and closing of the sliding panel 230, it is possible to supply electric power to the heating wire 232 at all times regardless of the opening and closing state of the sliding panel 230. For this reason, it is possible to remove the frost of the sliding panel 230 by operating the defroster even when the sliding panel 230 is opened, and hence to ensure the rear view.

Since the curled cord 400 is extended and contracted in one direction, the space which is occupied by the electrical power supply cord that supplies electric power to the heating wire 232 of the sliding panel 230 decreases. For example, the electrical power supply cord can be provided between the rear panel and the trim board. For this reason, it is possible to facilitate the vehicle layout.

In this stage, since the holding pipe 410 is inserted into the spiral portion of the curled cord 400, the arrangement position of the curled cord 400 with respect to the guide rail 310 can be substantially maintained in a uniform state even when the curled cord 400 is extended and contracted. For this reason, the contact of the curled cord 400 with respect to another member is suppressed. Thus, for example, noise or damage caused by a contact can be reduced. Furthermore, since the curled cord 400 is extended and contracted in response to the movement of the sliding bracket 320 and is integrated with the guide rail 310, the curled cord 400 can be stably extended and contracted.

A power supply apparatus which supplies electric power to the heating wire 232 of the sliding panel 230 includes the guide rail 310, the sliding bracket 320, and the curled cord 400 among the above-described components. However, the power supply apparatus may also include a component other than the guide rail 310, the sliding bracket 320, and the curled cord 400 in order to exhibit a more superior function.

Incidentally, since the slide mechanism such as the guide rail 310 and the sliding bracket 320 exists in an inner space as illustrated in FIG. 3, the trim board 116 which constitutes the interior of the cabin 110 is fixed to the rear panel by a clip attached to the lower portion of the guide rail 310. In this case, since a portion in the vicinity of the upper end of the trim board 116 is not fixed, the trim board 116 is deformed by the vibration in traveling or the like, and hence, for example, creaking noises may be easily generated.

Figure 11:
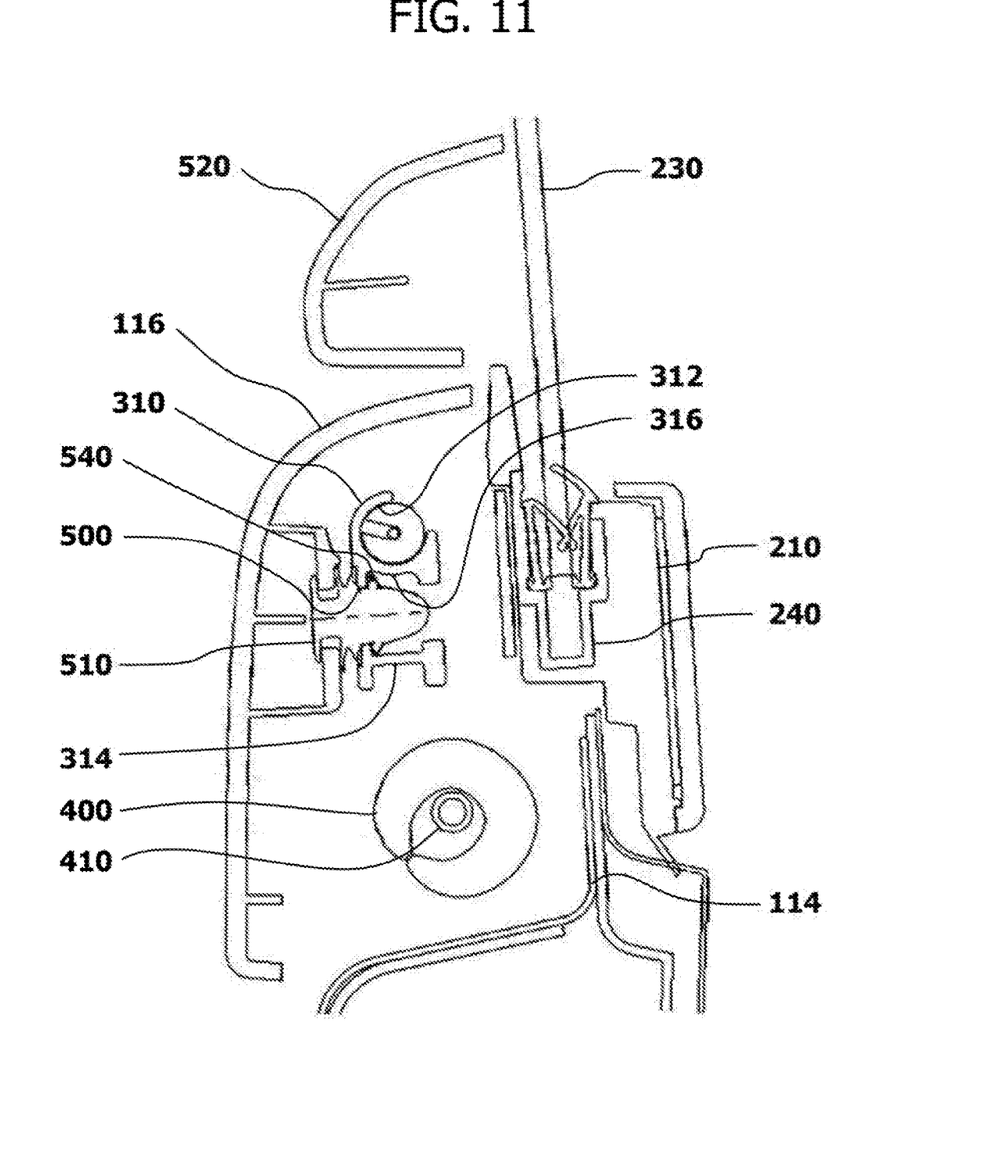
FIG. 11 is a view illustrating a method of improving the fixing rigidity of a trim board.

Here, in order to improve the fixing rigidity of the trim board 116 with respect to the rear panel, a plurality of (for example, four) clip fitting holes 500 may be formed on the side surface of the guide rail 310 and a plurality of resinous clips 510 may be attached to the inner surface of the trim board 116 so that the clips 510 are fitted to the fitting holes 500 as illustrated in FIG. 11. In this way, since a portion in the vicinity of the upper end of the trim board 116 is fixed to the guide rail 310 by the clips 510, the fixing rigidity of the trim board 116 can be improved. Then, it is possible to suppress the creaking noises caused by vibration in traveling or the like by improving the fixing rigidity of the trim board 116.

Details of a method of fixing the trim board 116 will be described below.

Between the upper slide groove 312 and the lower slide groove 314, the fitting holes 500 of the guide rail 310 are formed so as to penetrate the inner side surface facing the inside of the cabin 110 and the outer side surface facing the outside thereof. Accordingly, the fitting holes 500 penetrate the cavity 316 of the guide rail 310. For this reason, the cavity 316 of the guide rail 310 serves as a concave portion that accommodates a regulation portion 540 of the clip 510 to be described later. In addition, the fitting hole 500 of the guide rail 310 is formed at a position and with a dimension that do not decrease the rigidity of the upper slide groove 312 and the lower slide groove 314.

In order to regulate the movement of the clip 510 in a direction separated from the fitting hole 500 of the guide rail 310, for example, the annular regulation portion 540 which outwardly protrudes from the peripheral wall of the clip 510 is integrated with the distal end of the clip 510. Accordingly, in a state in which the clip 510 is inserted and fitted to the fitting hole 500 of the guide rail 310, the regulation portion 540 of the clip 510 is accommodated in the cavity 316, and thus, the trim board 116 is fixed to the guide rail 310. Then, for example, even when an external force is exerted in a direction in which the clip 510 is separated from the fitting hole 500 by the vibration of the vehicle or the like, a part of the regulation portion 540 contacts the inner surface of the guide rail 310 that defines the cavity 316, and hence the separation of the clip 510 is suppressed.

Figure 7:
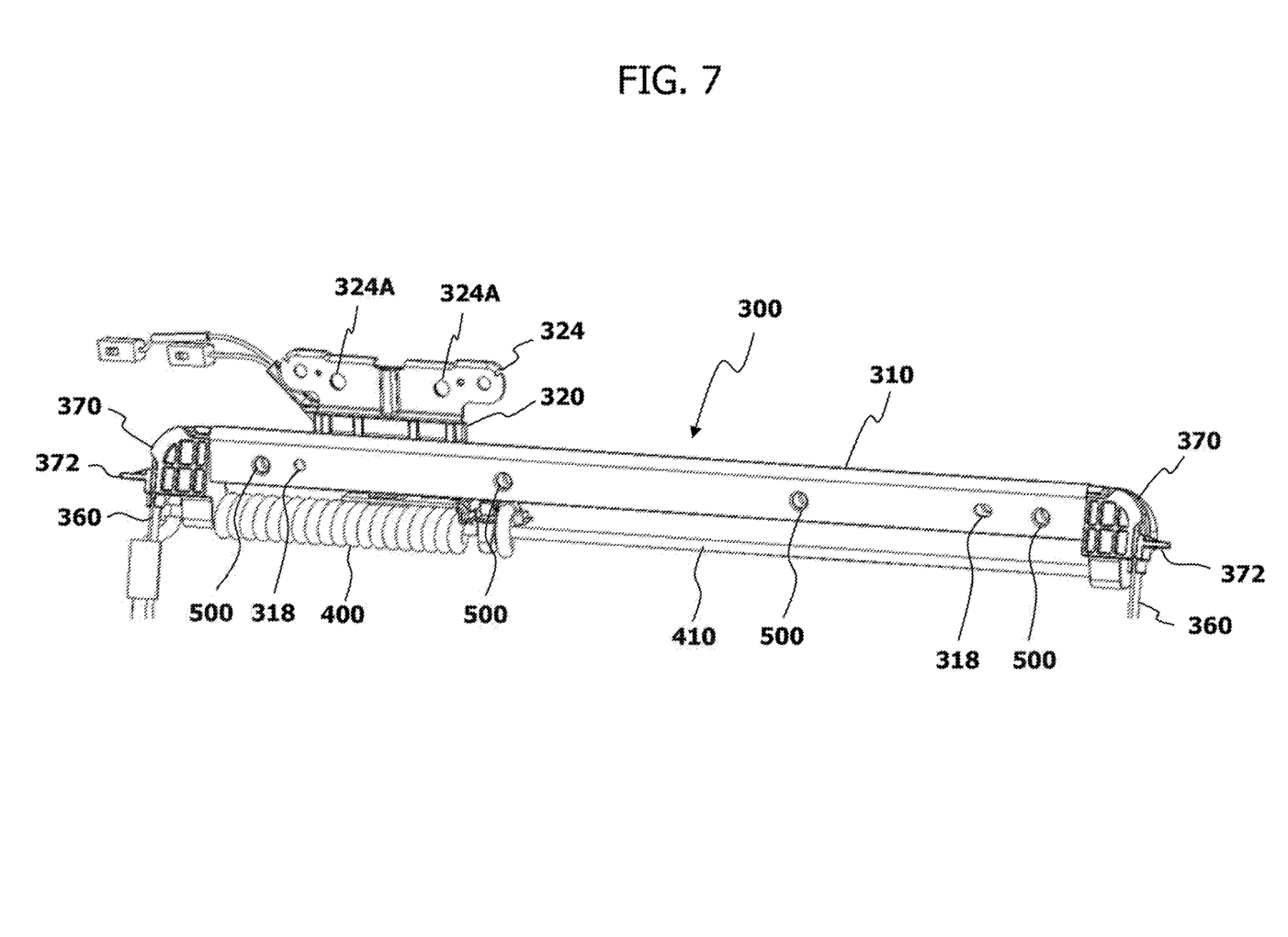
FIG. 7 is a detailed partially enlarged view illustrating the electric slide mechanism.

The joint 370 which is fixed to each of both ends of the guide rail 310 may contact a guide portion (not illustrated) formed in the inner surface of the trim board 116 when the trim board 116 is fixed to the guide rail 310, and may also have a function of regulating the installation position of the trim board 116. Specifically, the side surface of the joint 370 facing the lateral side of the cabin 110 is provided with a contact surface 372 which contacts the guide portion formed in the inner surface of the trim board 116 when the trim board 116 is fixed to the guide rail 310 as illustrated in FIG. 7. The contact surface 372 may be formed in a shape similar to the inner surface of the trim board 116, for example, a shape having an inclined surface, or the like. Furthermore, in order to regulate the relative displacement with respect to the trim board 116, the contact surface 372 may be provided with unevenness or the like, for example.

Accordingly, when the trim board 116 is fixed to the guide rail 310, the inner surface of the trim board 116 contacts the contact surface 372 of the joint 370, so that the trim board 116 is guided to the installation position. For this reason, the position of the clip 510 is regulated to an appropriate installation position. Then, since the trim board 116 is attached to an appropriate position, for example, creaking noises can be effectively suppressed. Furthermore, since the relative positions of the inner panel 114 and the trim board 116 are maintained, it is possible to stably ensure a space that accommodates the slide mechanism for sliding the sliding panel 230.

Since the second bracket 260, the sliding bracket 320 and the like, are attached to the lower portion of the sliding panel 230 of the rear window 200, the beautiful appearance thereof is degraded. For this reason, the lower portion of the sliding panel 230 may be covered by a cover such as a trim board in order to ensure the appearance of the interior of the pickup truck 100.

Figure 12:
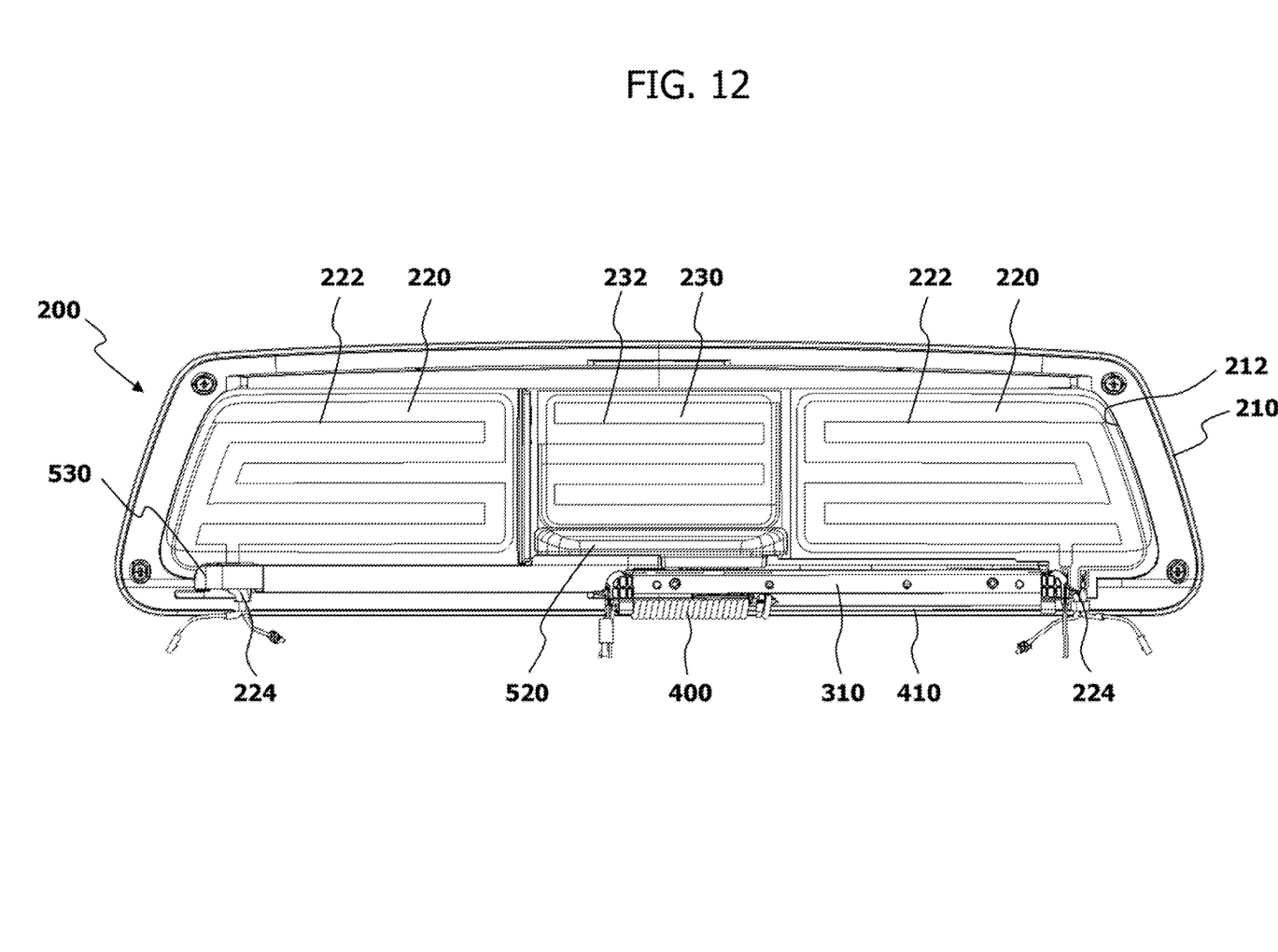
FIG. 12 is a view illustrating a method of ensuring a rear view of the rear window.

When a cover is attached in the entire length of the rear window 200 in the longitudinal direction, the lower portion of the fixed panel 220 is also covered, and hence a part of the rear view is hidden. Here, as illustrated in FIG. 12, the rear view can be ensured in a manner such that a first cover 520 extending in the entire length of the sliding panel 230 in the slide direction is attached to the lower portion of the sliding panel 230 and a second cover 530 only covering the connector 224 is attached to the lower portion of the fixed panel 220. Here, in the embodiment illustrated in FIG. 12, the second cover 530 is not attached to the fixed panel 220 which is located at the right side in FIG. 12, but the second cover 530 is actually attached thereto. In addition, in a case in which the connector 224 of the fixed panel 220 is covered by the trim board of the cabin 110, the second cover 530 may not be attached to the fixed panel 220.

Regarding the above-described embodiment, various existing electrical power supply cords which are extended and contracted in one direction may be used instead of the curled cord 400 in order to supply electric power to the heating wire 232 of the sliding panel 230.

It is not limited that the sliding window according to the embodiment be opened and closed electrically, and it may be a structure which is opened and closed manually. In this case, the drive unit 350 and the cable 360 are not needed in the rear window 200 illustrated in FIG. 2. In addition, since the other operations and effects are similar to those of the above-described embodiment except that the sliding panel 230 is not opened and closed electrically, the description thereof will be omitted in order to avoid duplication of explanation.

Furthermore, the sliding window according to the embodiment is not limited to a structure including the two fixed panels 220 and the one sliding panel 230 as in the rear window 200 illustrated in FIG. 2, and it may also be applied to a structure in which the fixed panel 220 is attached to at least one side of the sliding panel 230 in the slide direction.

The sliding window according to the embodiment is not limited to the rear window 200 of the pickup truck 100, and it may also be applied to a side window which extends in the front to rear direction of any vehicle, or to a sun roof of any vehicle for opening and closing the roof. Furthermore, it is not limited to the sliding window according to the embodiment be opened in the left and right (lateral) direction, and it may be opened and closed in the up and down direction.

The sliding window according to the embodiment may be directly attached to a vehicle body without using the window frame member 210. In this case, for example, a configuration may be employed in which the pair of rails 240 is attached to the cabin 110 of the pickup truck 100 and the sliding panel 230 is fitted thereto in a slidable manner.

In addition, the configurations of the embodiment may be individually implemented in accordance with the purpose thereof.

It should be noted that the entire contents of Japanese Patent Application No. 2013-163904, filed on Aug. 7, 2013, on which convention priority is claimed, is incorporated herein bt reference.

It should also be understood that many modifications and variations of the described embodiments of the invention will be apparent to a person having an ordinary skill in the art without departing from the spirit and scope of the present invention as claimed in the appended claims.

What is claimed is:

1. A sliding window for a vehicle comprising:
   a sliding panel with an electrical equipment, the sliding panel attached to a vehicle body in a slidable manner;
   a guide rail integrated with the vehicle body and extending in the slide direction of the sliding panel;
   a sliding bracket integrally including a sliding portion coupled to the guide rail in a slidable manner and a fixed portion fixed to the sliding panel; and
   an electrical power supply cord disposed along the guide rail, configured for supplying electric power to the electrical equipment of the sliding panel, and to extend and contract in one direction,
   wherein one end of the electrical power supply cord is fixed to the sliding bracket, and
   other end of the electrical power supply cord is fixed to the vehicle body or a member integrated with the vehicle body.

2. The sliding window for a vehicle according to claim 1, wherein two opposite surfaces of the guide rail in a plane parallel to the sliding panel are interposed between two surfaces of the sliding bracket.

3. The sliding window for a vehicle according to claim 1, wherein one end of the electrical power supply cord is fixed to the sliding bracket through a cord-holding bracket which holds the electrical power supply cord at a predetermined position, the cord-holding bracket being attached to the sliding bracket.

4. The sliding window for a vehicle according to claim 1, wherein a holding member which maintains the position of the electrical power supply cord is integrated with the guide rail.

5. The sliding window for a vehicle according to claim 4, wherein the holding member is a pipe extending in a direction in which the electrical power supply cord is extended and contracted.

6. The sliding window for a vehicle according to claim 1, wherein the electrical equipment is a heating wire.

7. The sliding window for a vehicle according to claim 1, wherein the electrical power supply cord is a curled cord.

8. The sliding window for a vehicle according to claim 1, wherein the sliding panel slides electrically.

9. The sliding window for a vehicle according to claim 1, wherein the sliding panel is slidably attached to a window frame member fixed to an opening of the vehicle body.

10. The sliding window for a vehicle according to claim 1, wherein the guide rail is provided with a fitting hole into which a clip of a trim board is fitted.

11. The sliding window for a vehicle according to claim 1, wherein the sliding panel is attached to a rear window of a cabin of the vehicle body.

12. The sliding window for a vehicle according to claim 11, further comprising:
    a first cover attached to the entire length of the sliding panel in the slide direction and placed over the fixed portion of the sliding bracket; and
    a second cover attached to a fixed panel disposed in at least one side of the sliding panel in the slide direction and placed over a connector for supplying electric power to the heating wire of the fixed panel.

13. A power supply apparatus comprising:
    a guide rail integrated with a vehicle body and extending in the slide direction of a sliding panel slidably attached to the vehicle body;
    a sliding bracket integrally including a sliding portion coupled to the guide rail in a slidable manner and a fixed portion fixed to the sliding panel; and
    an electrical power supply cord disposed along the guide rail, configured for supplying electric power to the sliding panel, and to extend and contract in one direction.

14. The power supply apparatus according to claim 13, wherein one end of the electrical power supply cord is fixed to the sliding bracket through a cord-holding bracket holding the electrical power supply cord at a predetermined position, the cord-holding bracket being attached to the sliding bracket, and
    the other end of the electrical power supply cord is fixed to the vehicle body or a member integrated with the vehicle body.

15. The sliding window for a vehicle according to claim 7, wherein one end of a spiral portion of the curled cord is crimped and held to the sliding bracket by elastic restoration force of the spiral portion, and other end of the spiral portion of the curled cord is crimped and held to the vehicle body or the member integrated with the vehicle body.

16. A sliding window for a vehicle comprising:
    a sliding panel with an electrical equipment, the sliding panel attached to a vehicle body in a slidable manner;
    a guide rail integrated with the vehicle body and extending in the slide direction of the sliding panel, the guide rail having an arc-shaped upper slide groove;
    a sliding bracket integrally including a sliding portion coupled to the guide rail in a slidable manner and a fixed portion fixed to the sliding panel, the sliding portion including a cylindrical slide member coupled with the arc-shaped upper slide groove; and
    an electrical power supply cord disposed along the guide rail, configured for supplying electric power to the electrical equipment of the sliding panel, and to extend and contract in one direction.

17. The sliding window according to claim 15, wherein the guide rail includes a channel-shaped lower slide groove, and
    wherein the sliding bracket includes a block coupled with the lower slide groove.

* * * * *